United States Patent [19]

Buchmann

[11] 3,871,801

[45] Mar. 18, 1975

[54] MACHINE FOR ENCLOSING EXPANDED PLASTIC MATERIAL FOR MOULDING PARTS

[75] Inventor: Rudolf C. Buchmann, Mannheim-Feudenheim, Germany

[73] Assignee: Pont-A-Mousson S.A., Nancy, France

[22] Filed: Nov. 24, 1972

[21] Appl. No.: 309,028

[30] Foreign Application Priority Data
Nov. 29, 1971 Germany............................ 2159005
Dec. 2, 1971 Germany............................ 2159809
Dec. 2, 1971 Germany............................ 2159794

[52] U.S. Cl................ 425/4 R, 425/258, 425/442, 425/817 R
[51] Int. Cl............................................ B29d 27/00
[58] Field of Search ....... 425/412, 242, 4, 817, 414, 425/251, 252, 258, 257, 260, 441, 442, 443; 264/51, 53, DIG. 9, DIG. 10; 164/192

[56] References Cited
UNITED STATES PATENTS
3,042,793 7/1962 Brockhues...................... 425/817 X
3,756,762 9/1973 Maugweiler....................... 425/258

FOREIGN PATENTS OR APPLICATIONS
539,786 9/1941 United Kingdom................... 264/51
1,233,577 2/1967 Germany............................... 425/4
1,083,678 9/1967 United Kingdom................... 264/53

*Primary Examiner*—R. Spencer Annear
*Assistant Examiner*—Mark Rosenbaum
*Attorney, Agent, or Firm*—Sughrue, Rothwell, Mion, Zinn & Macpeak

[57] ABSTRACT

A machine for enclosing fine pre-expanded particles for subsequent moulding in a mould, comprising pouring into a moulding cavity of a mould through a large charging opening of the mould, by the effect of gravity and in bulk, a mass of preexpanded but still inflatable particles the volume of which is at least equal to that of the part to be manufactured. The mass is compressed in such manner as to reduce interstitial spaces between the particles and expel a part of the trapped air. The desired volume of the part is completed by charging an excess amount of particles, after which the particles are subjected to an agglomerating treatment by water vapour and/or other agent and the part is stripped from the mould.

15 Claims, 7 Drawing Figures

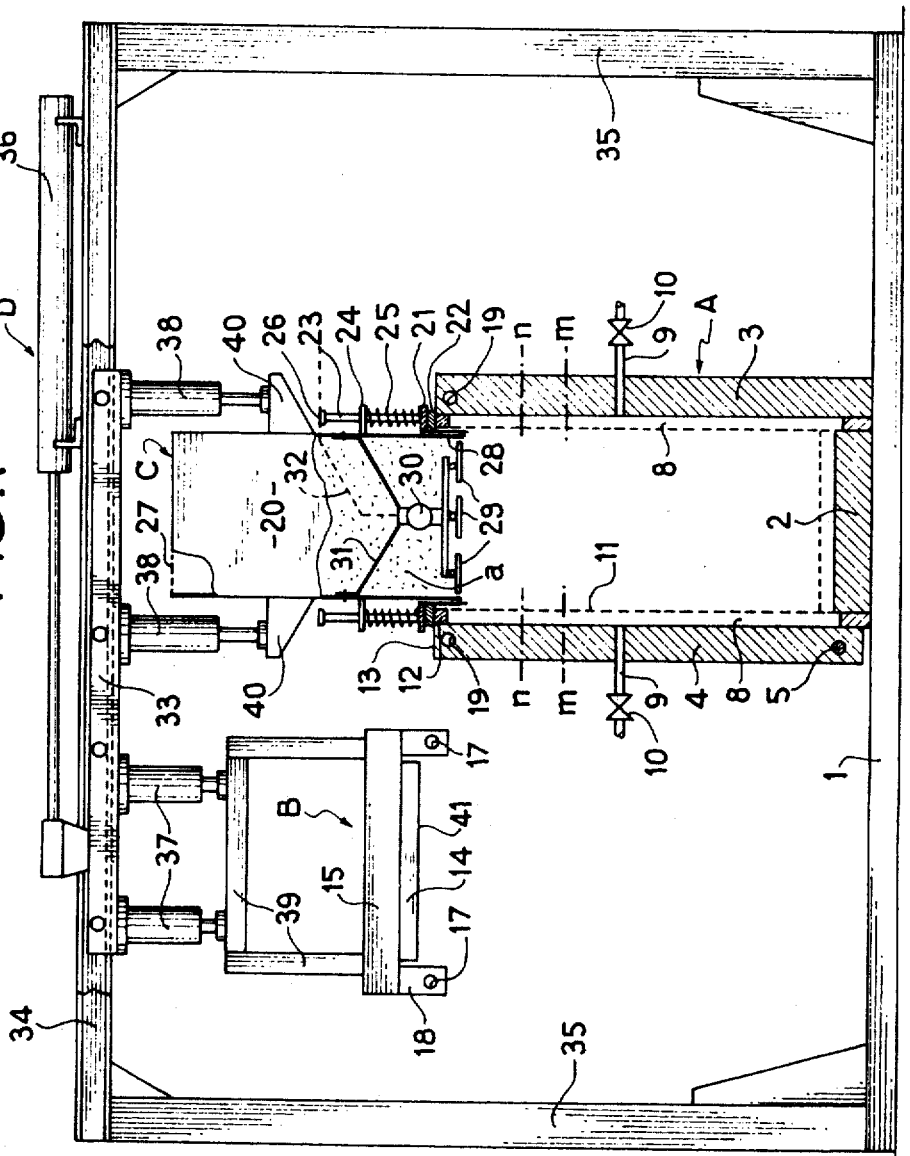

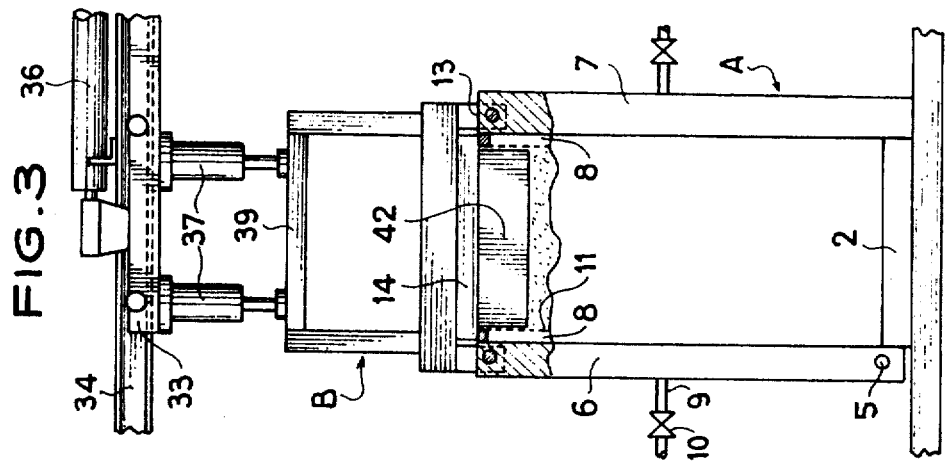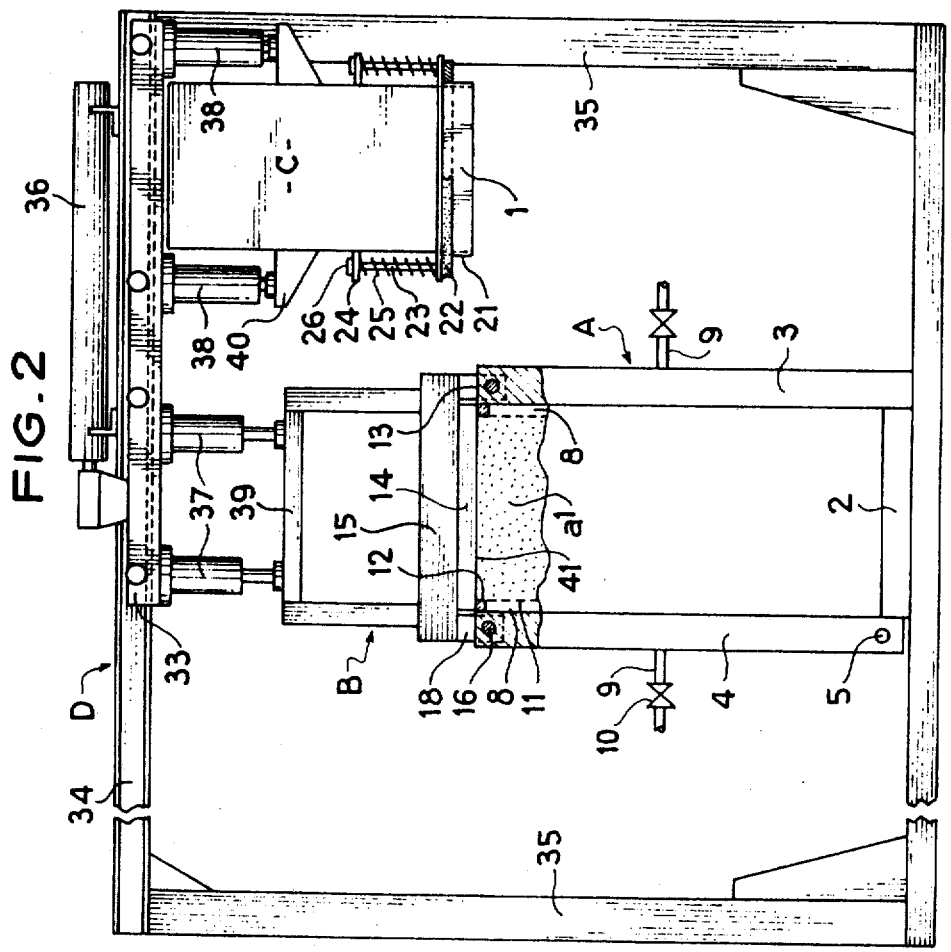

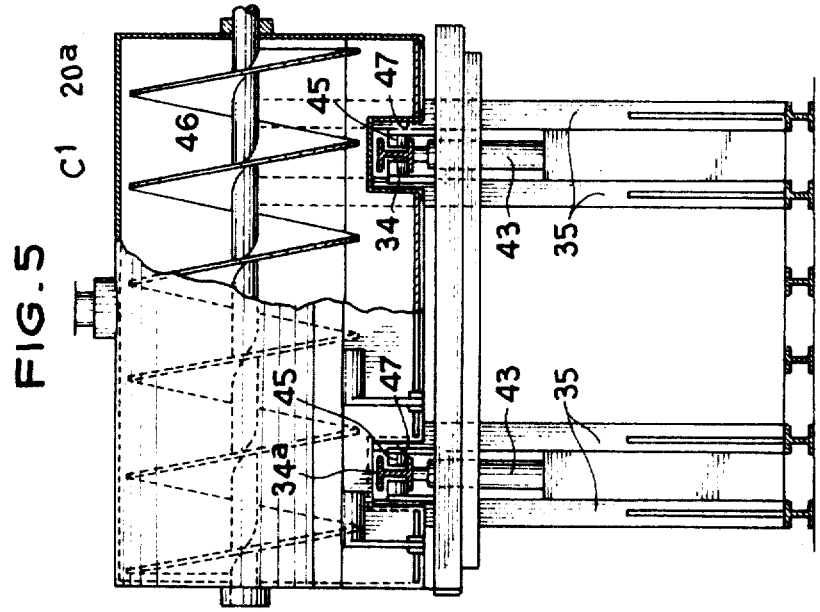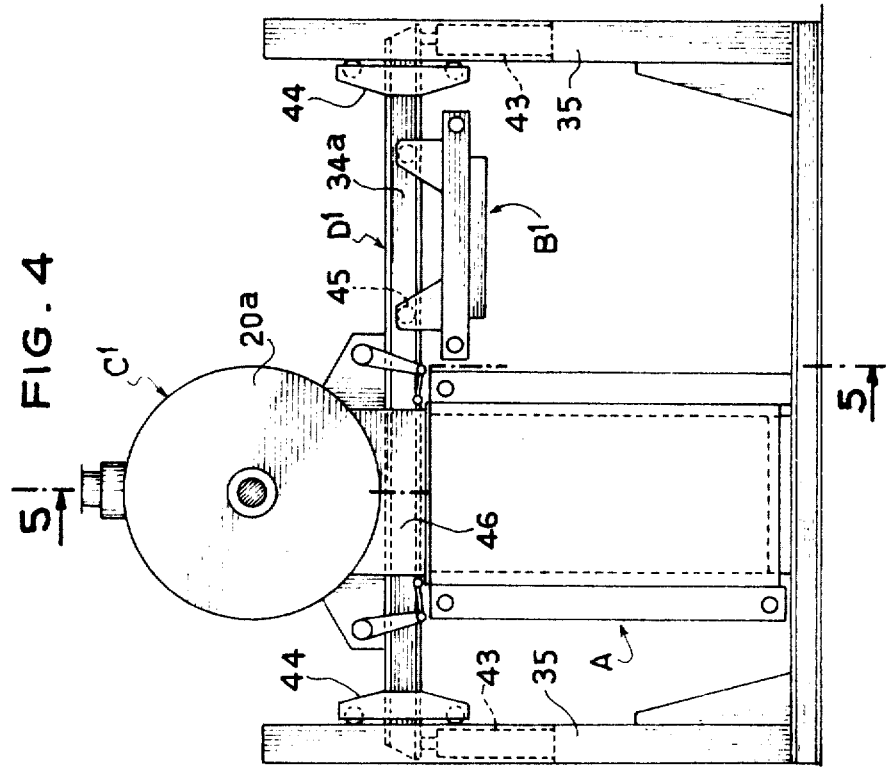

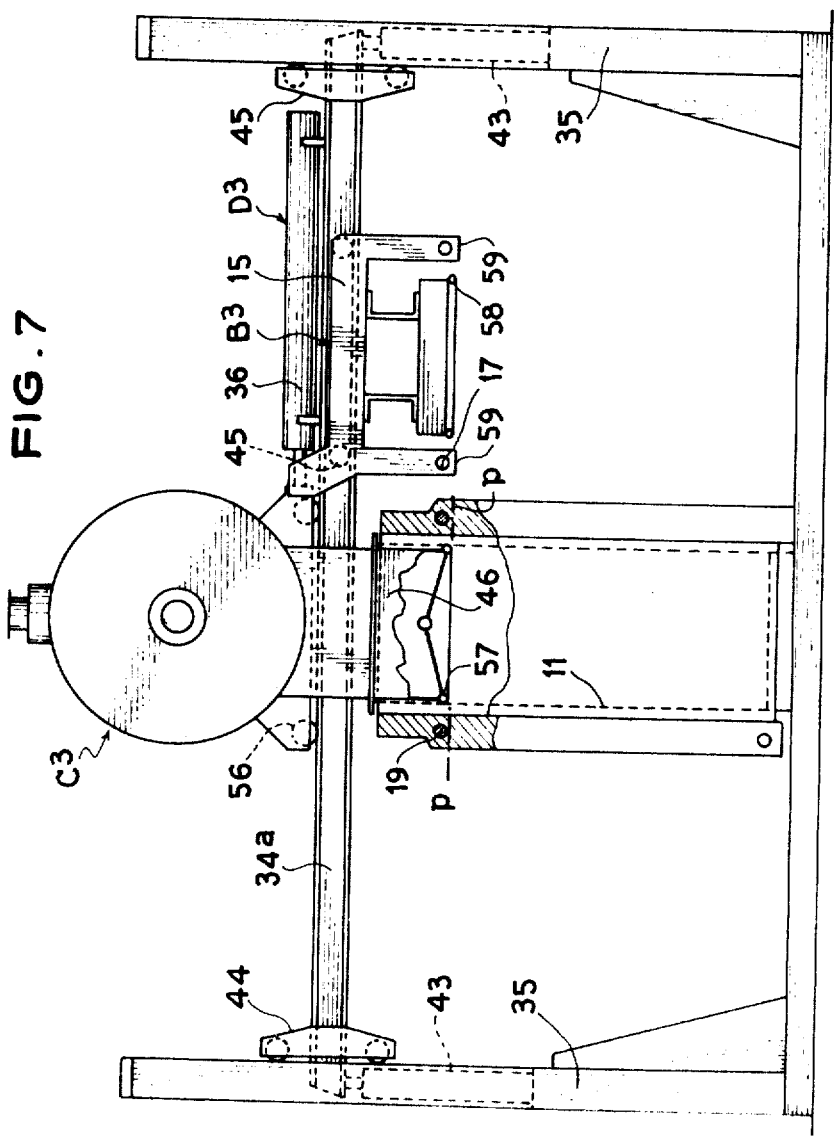

MACHINE FOR ENCLOSING EXPANDED PLASTIC MATERIAL FOR MOULDING PARTS

The present invention relates to the manufacture of moulded parts of expanded plastics material.

The industry employing fine pre-expanded and still inflatable particles of plastics material for moulding parts has for some time used moulds or dies of ever increasing size for the manufacture of blocks, slabs or other shaped parts. For example, use of moulds for blocks measuring 650 × 1,250 × 6,000 mm are current practice in the industry. However, the technique for charging these large moulds has not followed the same evolution.

There are still employed the conventional methods for charging small moulds, namely the pouring of the particles after manually opening the cover of the mould by means of flexible charging pipes connected to tanks, or the pouring from charging vessels which are mounted above the moulds and lowered over filling openings in the latter.

This manner of proceeding gives, in the case of large moulds, unsatisfactory results for several reasons:

Improvements in the method of pre-expanding the plastics material have resulted in a reduction of the specific weight of the pre-expanded particles, for example from 20-25 to 10-12 kg/m$^3$.

This reduction in weight is accompanied by a large increase in the size of the individual substantially spherical particles and consequently an increase in the size of the space between the particles and a decrease in the force of expansion and consequently in the aptitude that the spherical particles have to agglomerate, that is to say, to weld together. In addition to the reduced force of expansion of the various larger particles, the reduced tendency to aggomerate results in finished blocks which are badly welded and exhibit a sinking in the regions of their edges.

These drawbacks are worsened by the air trapped between the particles of the material poured from, for example, charging vessels, since this air is trapped in the moulding and giving rise to cavities.

Attempts have been made to remedy the various aforementioned drawbacks in moulds having an openable cover by an additional manual compression of the particles previously introduced in the mould and by an over-filling of the mould with an accumulation of excess particles in an amount which unfortunately cannot be determined. Thus, when the cover is applied on the edge of the mould box, a part of the excess material is laterally expelled over the inner edge of the mould box and is deposited between the cover and this edge and prevents the locking of the cover in the mould-closing position.

Another drawback of known devices resides in the fact that they are incapable of permitting a controlled correction of the density and, consequently, of the weight of the parts to be manufactured. Now this correction is necessary, since if the specific weight of the blocks or other parts produced is well determined at the pre-expansion stage, this operation is unfortunately inevitably accompanied by certain fluctuations in the specific weight, for example of the order of 5-8 percent in respect of a pre-expansion of 15g/litre.

By means of a known new process it has been possible to remedy the aforementioned drawbacks owing to the fact that the space provided for the final forming in a mould equipped in part with movable walls is first increased in size to a certain extent and then, after having been filled with the moulding mass, brought back to the desired final volume by a single or several successive compressions exerted on one or more outer walls of the mould. This process in which the material is poured through closable openings in a part of a cover which is raisable and lowerable in the cavity of the mould, has indeed given good results as concerns the compression of the moulding material but possesses the drawback that the charging of a moulding cavity of several cubic metres through openings which are of necessity relatively small takes too long, for example 4-8 minutes and, moreover, gives rise to the formation below the small charging openings of caving-in cones which require additional measures to be taken if they are to be eliminated.

With this known process and device, the compression can only be effected as a function of the depth — which is determined once and for all — to which for example the cover of the moulding box is depressed and this has for consequence that the compression occurs possibly only in the marginal regions.

An object of the present invention is to improve upon this prior process and to permit the rapid manufacture by simple means of moulded parts, and in particular large blocks, of excellent quality of expanded plastics material from fine pre-expanded but still inflatable particles, the invention permitting in particular an acceleration of the charging and a pre-determined compression of the charge.

The invention provides a process for manufacturing, by moulding, moulded parts of expanded plastics material from fine pre-expanded particles, comprising pouring into a moulding cavity of a mould through a large charging opening of the mould, by the effect of gravity and in bulk, a mass of pre-expanded but still inflatable particles the volume of which is at least equal to that of the part to be manufactured; compressing said mass in such manner as to reduce interstitial spaces by expelling a part of the air trapped therein; completing the desired volume of the part to be manufactured by charging an excess amount of particles; hermetically closing and locking the mould so that it is capable of resisting the internal pressure developed within the mass of particles in the course of the subsequent agglomeration of said particles by their mutual welding under the action of water vapour and/or other suitable agents; carrying out said agglomerating treatment; and stripping the moulded part from the mould.

The compression may be carried out in one operation or by means of several successive compressions, each compression being followed by a charging of an excess amount of particles.

As concerns the charging of the excess amount of particles, one of two procedures may be adopted:

a. The moulding cavity has a volume equal to that of the part to be manufactured and in this case the compression is carried out after completely filling the cavity which, in compressing the charged mass, produces a free space which is subsequently filled with the excess charge whereafter a further compression is effected, if desired, followed by a further excess charging once or a plurality of times.

b. The moulding cavity has an oversize volume and the charging of an excess amount of particles occurs upon the initial charging which fills this cavity, the subsequent compression returning the charged mass to the desired volume.

It will be observed that by adjusting the compression travel it is possible to manufacture moulded parts of different volumes with a single mould.

Another object of the invention is to provide a moulding machine for carrying out the process defined hereinbefore, said machine comprising in combination: a moulding box having at least one moulding cavity provided with a large upper charging opening; a closing cover capable of closing said charging opening in a fluidtight manner; means for locking said cover in the closing position; a bin filling device whose capacity is at least equal to that of said moulding cavity and is provided with a lower pouring opening having a shape and dimensions substantially corresponding to those of said upper charging opening, the elements consisting of said cover and said charging device being movable relative to the moulding box and at least one of said elements being slidable in the moulding cavity; and shifting means for shifting the cover and the charging device with respect to the moulding box and to the moulding cavity.

The shifting means for the cover and the filling device are so arranged that each of said two elements is vertically movable along an axis of the moulding cavity and that at least one of said elements is movable transversely of the mould for the purpose of withdrawing it from the mould.

Further features and advantages of the invention will be apparent from the ensuing description with reference to the accompanying drawings.

In the drawings:

FIG. 1 is a vertical sectional view of a machine according to the invention for manufacturing blocks of expanded plastics material which permits a rapid charging and entirely automatic compression by means of a charging bin;

FIG. 2 is a view similar to FIG. 1, the charging bin being laterally withdrawn and the closing cover being in position above the charging opening;

FIG. 3 is a vertical sectional view of the machine shown in FIG. 1 showing a modification of the cover;

FIG. 4 is a sectional view of a modification of a machine according to the invention;

FIG. 5 is a vertical sectional view taken on line 5—5 of FIG. 4 of the arrangement of the cover guide rails;

FIG. 7 is an elevational view of another modification of a machine according to the invention.

Figure 6:
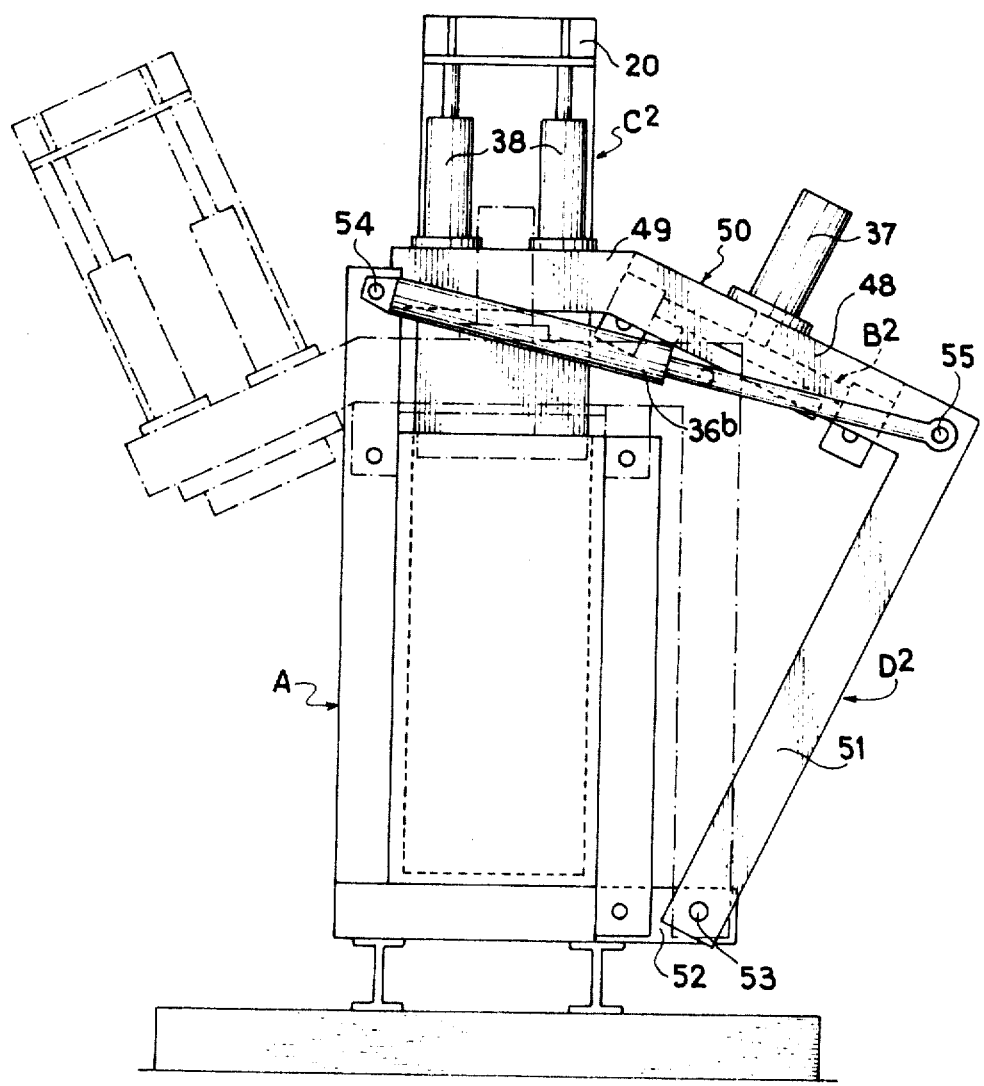
FIG. 6 is a diagrammatic side elevational view of another embodiment of a machine according to the invention in which the charging bin and the element locking the cover are movable on pivotal arms and are capable of both being pivoted to a position above or to one side of the charging bin.

In the embodiment shown in FIGS. 1–3, the machine comprises in combination: a moulding box or mould A, a cover B for closing the filling or charging opening of the mould, a device C having a mould charging bin and a mechanism D for shifting the cover B and the bin C with respect to the mould A.

The mould A bears on a stand 1 and includes a fixed bottom wall 2, a fixed transverse wall 3, a transverse wall 4 pivotably movable for example through 5°–10° about a horizontal spindle 5 for stripping the part from the mould, and two fixed longitudinal walls 6 and 7 (FIG. 3).

The longitudinal wall 6, 7 and/or transverse walls 3, 4 may constitute, as shown, double walls whose cavities 8 are connected in the known manner to conduits 9 provided with regulating valves 10 and adapted to admit water vapour or other agent for agglomerating the particles of plastics material.

The moulding cavity 11 defined above the bottom wall 2 by the walls 3, 4 and 6, 7 is therefore prismatic and in the presently-described embodiment the cross-sectional shape is sqaure or rectangular although it is not intended to limit the scope of the invention to this section. The cavity 11 communicates in the upper part of the mould by way of a large charging opening 12 which has dimensions and shape corresponding to those of said cross-sectional shape and is defined by the edges of the plane upper end surfaces of the lateral walls of the mould.

This opening 12 can be closed in a fluidtight manner by the cover B. The latter comprises a closure member proper 14 (FIGS. 1 and 2) having a horizontal section greater than the opening 12 so that the closure member can bear against the upper edge 13 of the mould. The closure member 14 is carried by a horizontal plate 15 which may be connected to the mould by means of pins 16 (FIG. 2) engaged in pairs of aligned apertures respectively provided at 17 (FIG. 1) in lugs 18 integral with the plate and at 19 in the walls of the mould.

The charging bin C is constituted by a prismatic vessel 20 whose horizontal section is very slightly less than that of the mould so that it is vertically slidable in the latter after the cover B has been laterally withdrawn (FIG. 1). This bin has a capacity at least equal to the capacity V of the moulding cavity 11. It is encompassed by a ring 21 which is of the same shape as and, slidably mounted on, the walls of the bin and provided with lower sealing means 22. This ring is fixed to vertical rods 23 which are slidably mounted in brackets or lugs 24 which are rigidly secured to the bin. Springs 25 mounted on the rods between the ring 21 and the lugs 24 bias the ring 21 and the sealing means 22 downwardly of the bin, the lower extreme position thereof corresponding to the abutment of the heads 26 of the rods 23 against the lugs 24 (FIG. 2).

It will be understood that the bin is provided in its upper part with a charging opening 27 (FIG. 1) whereas in its lower part the discharging opening 28 is defined by the inner surfaces of the walls of the bin. This opening 28 can be closed by flaps or shutters 29 which are withdrawable, by sliding or swinging, by the action of a cylinder device 30 which is carried together with the flaps by brackets 31 which secure the body of the cylinder device to the walls of the bin. The cylinder device is fed with fluid by one or more conduits 32.

The cover B and the device C are connected to the mechanism D for shifting them, on one hand, vertically and independently of each other and, on the other hand, horizontally — in a simultaneous manner in the illustrated embodiment. However, it must be understood that the invention is not intended to be limited to this illustrated arrangement.

The mechanism D comprises a carriage 33 which is horizontally movable along rails 34 by uprights 35 under the action of a double-acting cylinder device 36. Fixed to the carriage 33 are cylinders of cylinder devices 37 and 38. Some of the vertical piston rods of the latter cylinder devices are fixed to a chassis 39 which rigidly carries the cover B and the other vertical piston rods are fixed to brackets 40 rigidly secured to the vessel 20 of the charging device C. The cylinder device 36 is therefore capable of shifting the cover B and the device C simultaneously and horizontally between extreme positions illustrated respectively in FIG. 1 where the device C having the carging bin 1 is located vertically above the mould A and the cover B is laterally withdrawn from the mould toward the left and in FIG. 2 where the arrangement is reversed, the cover B being located vertically above the mould A and the device C laterally withdrawn toward the right. The cylinder devices 37 and 39 respectively permit vertically shifting the cover B and the device C with respect to the mould A which is stationary.

The process of manufacturing blocks of expanded plastics material by means of the machine described hereinbefore is carried out in the following manner:

At the start of the process and by means of the cylinder device 36, the charging device C, whose bin 20 is full of pre-expanded but still inflatable particles $a$ of plastics material, is brought to the position vertically above the mould and, by means of the cylinder devices 38, is lowered to the position shown in FIG. 1, the ring 21 affording a seal by its sealing means 22, since the sealing means are applied against the upper end surface 13 of the mould A by the compressed springs 25.

The flaps or shutters 29 are then withdrawn by means of the cylinder device 30 and the particles $a$ descend under the effect of gravity and in bulk into the cavity 11 of the mould A which they fill completely. The flaps 29 are then brought to the position for closing the bin 20 and then, by means of the cylinder devices 38, the bin 20 is once more shifted downwardly, the flaps 29 constituting pistons and compressing thereunder the mass of particles in bulk filling the mould. This mass is compressed, its level being lowered to $m-m$ (FIG. 1). The compression results in a reduction of the size of the spaces or interstices between the particles and an expulsion of a part of the air trapped therein. The bin 20 is then raised to the position shown in FIG. 1 and a free space of volume $v$ is then created between the level $m-m$ and the flaps 29. By a further pouring of particles $a$ (the bin having a volume exceeding the volume V of the cavity 11 of the mould to an extent at least equal to volume $v$), this space is filled and the mould is once more full of material which is compressed except that part of the material corresponding to the last charging. If desired, it is possible to carry out a second compression which brings the flaps to the level $n-n$ and a third charging of particles, and so on if necessary.

When the mould A has been filled with particles with the desired compression, the device C is raised by the cylinder devices 38 and shifted laterally (FIG. 2) by means of the cylinder device 36 which simultaneously brings the cover B to a position vertically above the mould. With the aid of the cylinder device 37, the cover B is lowered to the position shown in FIG. 2 and locked to the mould by passing the pins through the apertures 17 and 19 which are brought into alignment with each other.

The mould A filled with compressed particles $a^1$ is now ready to be subjected to a high internal pressure owing to the fact that the cover is locked and affords a fluidtight closure and the mould is of robust construction.

The next step of the manufacturing process can now be carried out, namely the agglomeration of the particles $a^1$ by their expansion accompanied by the automatic application of the resulting high pressure, by supplying water vapour or other suitable agent via the conduits 9.

The described machine and process have many advantages:

In the manufacture of blocks of large size, the machine permits pouring several cubic metres of particles in the moulding box A within a few seconds and achieving a complete filling of the mould and a predetermined compression of the charge.

The pouring or charging of the material in the large moulding box is indeed carried out as rapidly as possible in the known manner by means of the previously filled bin 20 which has a volume exceeding that of the moulding box, this bin being placed on the open end of the moulding box and the material flowing into the moulding cavity through the openings which have flaps and are located in the bottom of the bin. The invention uses to advantage this known manner of proceeding in the first stage for rapidly charging the mould cavity, but it teaches also vertically shifting the bin down to the level $m-m$, and possibly down to the level $n-n$, so as to compress the poured mass (this compression being impossible in the known method employing a fixed bin) and to ensure a correct filling even in the regions of the edges of the block to be moulded, and filling the resulting free space by at least one supplementary pouring of material.

It will be observed, moreover, that the mechanism controls the necessary movements of the successive operations in the most simple manner.

The machine may be installed in industrial buildings having a normal ceiling height owing to the fact that the charging device for pouring the material into the mould is combined with the means for closing and locking the cover of the mould so that these means constitute an element complementary to the charging device and these two elements, which are shifted by a single mechanism, effect a given movement together.

The machine described hereinbefore is so arranged that the moulding box A is not enlarged, so that, for example, for forming a block measuring 6,000 × 1,280 × 540 mm, this moulding box has up to its upper end 13 for closing the box a free height of only 1,280 mm so that there is no possibility of enlarging the volume of the mould. The material is then poured into the cavity 11 by means of the charging bin 20 of the device C which is deposited in a fluidtight manner on the upper end face 13 of the moulding box and thereafter driven into the moulding cavity, then the bin is raised so that the empty space $v$ created by the compression can be filled by a supplementary charging.

It is then possible either to repeat the operation or to raise the charging bin, deposit the cover B of the moulding box A on the upper end 13 of the latter and lock the cover in position.

It will be observed that owing to the action of the ring 21 with the sealing means 22 which are applied against the end surface 13 of the moulding box A, the material cannot escape from the moulding cavity even during the upward and downward movements of the charging bin.

The essential advantage of this embodiment of the machine therefore resides in the fact that without increasing the volume of the mould a pre-determined compression can be effected and repeated by means of an adjustable lowering of the charging bin with no need to separate the moulding box from the charging bin.

In the embodiment just described the moulding cavity 11 extends throughout the mould A between the upper surface of the bottom wall 2 and the lower surface 41 of the cover.

FIG. 3 shows a modification of the machine according to the invention in which the effective or useful height of the mould A is reduced to a value $V^1 < V$ owing to the fact that the cover B has on the lower face of its closure member 14 a projection 42 whose volume $v'$ corresponds wholly or partly to the volume $v$ corresponding to the space which is created by the initial compression.

In this case:

if $v' = v$, it is sufficient to fill the mould up to its upper edge by means of the bin 20, then put into position the cover B which compresses by its lower projection 42 the charged mass and reduces the volume thereof by the desired value $v$;

if $v' < v$, the first compression is effected by means of the charging bin; an excess volume of material is added, this volume being equal to $v$, and the cover B is placed in position and compresses the excess of the charged material until it reaches the volume $v - v'$.

In the embodiment shown in FIGS. 4 and 5, the charging device $C^1$ comprises a cylindrical charging bin $20''$ and it is secured to two support rails $34''$ of the mechanism $C^1$. These rails are disposed in a common plane and can be vertically shifted by means of two cylinder devices 43 and are guided by carriages 44 which are movable and guided along twin uprights 35. In this arrangement, the charging device $C^1$ can be moved upwardly away from the moulding box A. The cover $B^1$ is horizontally movable owing to its mounting by means of rollers 45 on the rails $24''$ and can be brought over the charging opening and then lowered onto or into the moulding box A by lowering the rails 27. As can be seen in FIG. 5, the rails $34''$ extend through a rectangular depending portion 46 of the bin $20''$ and extend for this purpose through recesses 47 in this depending portion, the bin-closing flaps being notched in the region of the walls defining these recesses.

In all the foregoing embodiments the bin of the charging device C or $C^1$ and the cover B or $B^1$ are movable in horizontal translation with respect to the mould A for the purpose of positioning them alternately over the mould. But this arrangement is not intended to be exclusive.

Thus in the embodiment shown in FIG. 6, the cover $B^2$ and the charging device $C^2$, which are still vertically movable when they are in vertical alignment with the mould A owing to the effect of their respective cylinder devices 37, 38, are movable in a circular direction by a swinging motion under the action of the mechanism $D^2$ for the purpose of positioning them alternately above the mould and in a laterally withdrawn position. The bodies of their cylinder devices 37, 38 are secured for this purpose of the respective planar portions 48, 49 of a support 50 which make an angle therebetween. This support is rigidly secured to, or is in one piece with, two parallel arms 51 which are pivoted to a lower bracket 52 by a horizontal pivot pin 53. An actuating cylinder device $36^b$ is pivoted at 54 to the moulding box A and at 55 to the support 50. In the illustrated extended position of the cylinder device $36^b$, the portion 49 of the support 50 is above the moulding box A and the cylinder device 38 vertically displaces the charging device $C^2$ so as to apply its bin 20 on the mould A for charging the material or raises it slightly for laterally withdrawing the bin to the position shown in dot-dash line. This withdrawal is achieved by causing the piston of the cylinder device $36^b$ to enter the latter and this at the same time shifts the cover $B^2$ from the withdrawn position shown in full line to the active closing position on the mould A.

Apart from this swinging motion, the operation of the machine is the same as that of the preceding embodiments.

FIG. 7 relates to another modification which permits solving another problem which frequently arises in the manufacture of blocks of expanded plastics material.

This problem resides in the fact that such blocks are employed in industry and the building trade in several standardized heights. For cold-storage insulation for example, blocks having a height of 1,000 mm are needed which are subsequently cut into panels to standardized dimension of 500 × 1,000 mm whereas for manufacturing stratified building elements the required height of the block is 1,200 or 1,250 mm.

In order to avoid keeping in reserve special moulds for these various dimensions, moulds are constructed for blocks of standard height, for example 1,300 mm and provided with a movable bottom wall.

However, these known machines have the drawback of requiring a large number of expensive auxiliary apparatus for shifting the bottom wall a distance of about 300 mm. Now in order to support the internal pressure when forming the blocks in a mould measuring 6,000 × 1,250 × 500 mm, five additional hydraulic cylinder devices are required in the bottom of the mould.

It would be desirable to have available a machine in which the useful or effective height of the mould above a fixed bottom could be modified by means of the cover if possible in a progressive manner and without any particular additional equipment. But in such an arrangement in which the cover must be capable of being shifted vertically downwardly into the cavity of the mould, the problem is how to pour the starting material into the mould up to the level corresponding to the required height of the block. This filling level must correspond as exactly as possible to the height of the block increased by a certain excess of material, the desired height being subsequently obtained by a compression of the material. The precision required to achieve this cannot be attained by a manual charging. It could also be envisaged to effect a charging through openings in the cover which is previously brought to the closing position corresponding to the desired height of the block. However, tests carried out in this respect have shown that the charging over a relatively short period of time requires very large charges which could not be placed on the cover. Moreover, this manner of charging does not prevent the formation of sinking cones in the material in the cavity of the mould below the charging openings.

Now, according to the present invention, it is possible to effect rapidly and in a sure manner without great cost of additional equipment, the charging of moulds for blocks whose heights are adjustable in their upper part and to regulate the mould height by means of a moulding machine of the type described hereinbefore in which the bin charging device $C^3$ and the cover $B^3$ of the mould box A are vertically movable and have a section slightly smaller than that of the opening of the moulding cavity so that it is possible to lower them into this cavity down to a variable level in accordance with the height of the blocks to be obtained and to raise them to a certain extent before the introduction of an excess of material which is compressed to the desired level.

The shifting mechanism D³ comprises, as in the embodiment shown in FIGS. 4 and 5, vertical uprights 35 and a horizontal support structure 34" for shifting and closing which may be raised or lowered in a direction parallel to itself by means of roller guides 44 and cylinder devices 43 and locked in position.

The cover B³ may be horizontally movable on the structure 34" by the provision of rollers 45 and the charging devices C³ may also be horizontally movably by the provision of rollers 56, the two elements B³ and C³ being interconnected. The support structure 34" travels through the charging bin by way of box-shaped recesses so that the charging device C³ can be moved freely.

In the Figure, the lower part 46 of the charging bin is freely engaged in the cavity 11 for the charging and compression of the material in the cavity to the level indicated by the line $p—p$ which corresponds to a height of 1,000 mm for the block. The leve $p—p$ may be varied as desired. Sealing means 57, for example employing compressed air, ensures the fluidtightness between the charging bin and the inner wall of the mould so as to prevent the plastics material therein from escaping. In order to modify the filling and compression height, the charging device C³ with the support structure 34" may be raised and held stationary as desired by means of cylinder devices 43. In order to ensure that the adjustment is always the same for a given filling level $p—p$ and for the corresponding position of the cover, adjustably movable control elements (end-of-travel switches) may be provided on the guide uprights 35.

When the mould has been charged, the support structure 34" with the charging device C³ and cover B³ is raised sufficiently to enable the charging bin to be laterally withdrawn by means of the cylinder device 36. The cover B³ is simultaneously brought to a position above the opening of the moulding box A and can be brought to the closing position by lowering the structure 34".

The cover is maintained in the closing position by the cylinder devices 43.

A compressed air seal 58 is provided on the lower part of the cover and on the charging vessel or bin 46.

Rigid downwardly extending legs 59 rigidly secured to the frame or reinforcement 15 of the cover maintain laterally closed the upper part of the walls of the moulding box A and lock the cover to the moulding box by means of pins engaged in apertures 19 and 17 which are formed in the moulding box A and in the legs 59 and brought into alignment with each other.

In a less advantageous modification of the machine according to the invention, the two elements of the moulding machine, constituted by the cover of the moulding box and the charging device, which are mounted separately or together on a fixed support structure secured to the moulding box or above the latter, may be separately laterally shifted, but each of these two elements must in this case be provided with a distinct raising device in contradistinction to the arrangement in FIG. 7.

The charging bin may be provided internally with one or more mixing or stirring means.

Having now described my invention what I claim as new and desire to secure by Letters Patent is:

1. A machine for enclosing particles of preexpanded plastics material for subsequent moulding of a part, said machine comprising in combination: a stand, a moulding box supported in a fixed position relative to said stand and having a moulding cavity and a large upper charging opening; a closing cover capable of closing said charging opening in a fluidtight manner; means for locking said cover in the closing position; a mould charging device having a bin whose capacity is at least equal to that of said moulding cavity and has a lower pouring opening having a shape and dimensions substantially corresponding to those of said upper charging opening, said cover and said charging device being vertically movable relative to the moulding box and stand and said bin being capable of descending partly into the moulding cavity; first shifting means for shifting the cover and the charging device vertically with respect to the stand and selectively toward and away from and coaxially of the moulding cavity; at least one of the elements consisting of the cover and the charging device being movable transversely of the moulding box to allow the other of said elements to be shifted toward the moulding box by the first shifting means; closure means for said pouring opening, said closure means being capable of being withdrawn to allow passage for said material substantially throughout said pouring opening to allow the material to fall into said moulding cavity; means for selectively withdrawing said closure means and putting said closure means in their closing position, said closure means being in their closing position capable of compressing said material upon descent of said bin into the mould cavity.

2. A machine as claimed in claim 1, comprising second shifting means for shifting at least said one of the elements transversely of the moulding box to allow said other of said elements to be shifted toward the moulding box by the first shifting means.

3. A machine as claimed in claim 1, wherein the cover and the charging device are both laterally movable in translation.

4. A machine as claimed in claim 1, wherein said second shifting means comprise a fixed horizontal runway, a carriage movable along the runway, and said first shifting means comprise cylinder devices having a vertical motion suspending the cover and the charging device from the carriage.

5. A machine as claimed in claim 3, comprising a vertically movable support structure on which the cover and the charging device are mounted.

6. A machine as claimed in claim 3, wherein said second shifting means comprise a cylinder device, a support pivotably mounted relative to the stand, the cylinder device having one end pivotably mounted relative to the stand and an opposite end pivotably connected to the support so that the cylinder device is capable of moving the support in a curvilinear path, and said first shifting means comprise cylinder devices having a vertical motion in their operative position above the mould respectively connecting the cover and the charging device to the support.

7. A machine as claimed in claim 1, wherein the cover is transversely movable.

8. A machine as claimed in claim 7, comprising a vertically movable support structure to which structure the charging device is rigidly secured, the cover being carried by said support structure along which it is movable transversely of the moulding box.

9. A machine as claimed in claim 8, wherein the charging bin comprises in its lower part transverse passages for permitting a free transverse displacement of the cover.

10. A machine as claimed in claim 9, wherein the moulding box has an upper edge surface and the bin has a slidable outer sealing means adapted to bear resiliently against the upper edge surface.

11. A machine as claimed in claim 1, wherein the lower part of the bin has sealing means adapted to slide into the moulding cavity.

12. A machine as claimed in claim 1, wherein the moulding box has an upper edge surface and the cover comprises a plate adapted to bear against the upper edge surface, and a projecting portion which downwardly projects from said plate which is for compressing the plastics material and is capable of sliding in the moulding cavity.

13. A machine as claimed in claim 1, wherein the cover comprises a plate, lugs integral with the plate means defining apertures in the lugs, means defining apertures on the moulding box, and detachable pins engaged in the apertures which are brought into alignment with each other for locking the cover to the moulding box.

14. A machine as claimed in claim 1, wherein the moulding box has a lateral wall which is pivotable for the purpose of opening the moulding box and stripping the part from the mould, and the cover has rigid legs adapted and arranged to be positioned astride lateral walls of the moulding box including said pivotable lateral wall for preventing the pivotable lateral wall from opening the moulding box.

15. A machine as claimed in claim 14, wherein said legs are part of said means for locking the cover to the moulding box.

* * * * *